(12) United States Patent
Yu et al.

(10) Patent No.: US 9,959,010 B1
(45) Date of Patent: May 1, 2018

(54) METHOD FOR DISPLAYING INFORMATION, AND TERMINAL EQUIPMENT

(71) Applicant: Beijing Kingsoft Internet Security Software Co., Ltd., Beijing (CN)

(72) Inventors: Qingqing Yu, Beijing (CN); Ruimin Huang, Beijing (CN); Bo Chen, Beijing (CN); Wen-Chen Feng, Beijing (CN); Hujia Duman, Beijing (CN); Ni Gan, Beijing (CN); Xinwei Wu, Beijing (CN); Jiabo Zhou, Beijing (CN); Xiaoming Sun, Beijing (CN); Ling Yu, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 0 days. days.

(21) Appl. No.: 15/421,976

(22) Filed: Feb. 1, 2017

Related U.S. Application Data

(63) Continuation of application No. PCT/CN2017/071544, filed on Jan. 18, 2017, which
(Continued)

(51) Int. Cl.
*G06F 3/00* (2006.01)
*G06F 3/01* (2006.01)
*G06F 3/048* (2013.01)
*G06F 3/0481* (2013.01)
*G06F 17/21* (2006.01)
(Continued)

(52) U.S. Cl.
CPC ........ *G06F 3/0481* (2013.01); *G06F 3/04883* (2013.01); *G06F 17/212* (2013.01); *H04L 67/26* (2013.01)

(58) Field of Classification Search
None
See application file for complete search history.

(56) References Cited

U.S. PATENT DOCUMENTS

| | | | | |
|---|---|---|---|---|
| 8,423,995 B2* | 4/2013 | Hsieh | ............ | G06F 3/0483 709/203 |
| 8,830,270 B2* | 9/2014 | Zaman | ............ | G06F 3/04883 345/473 |

(Continued)

FOREIGN PATENT DOCUMENTS

| | | |
|---|---|---|
| CN | 105573659 | 5/1916 |
| CN | 105867788 | 8/1916 |

(Continued)

*Primary Examiner* — Yongjia Pan
(74) *Attorney, Agent, or Firm* — Norton Rose Fulbright US LLP

(57) ABSTRACT

Embodiments of the present application disclose a method and for displaying information as well as a terminal equipment, wherein at least one information card is displayed on a display screen after it is detected that the display screen switches to a screen-on state from a screen-off state. The switch of the display screen to the screen-on state from the screen-off state indicates that a user may be in a spare state. In this case, target information potentially desired by the user is displayed in form of an information card, such that the user can browse the target information with spare time, thus increasing utilization of the spare time of users.

18 Claims, 8 Drawing Sheets

Related U.S. Application Data is a continuation-in-part of application No. PCT/CN2016/111825, filed on Dec. 23, 2016.

(51) Int. Cl.
  *G06F 3/0488* (2013.01)
  *G06F 17/00* (2006.01)
  *G06F 3/033* (2013.01)
  *H04L 29/08* (2006.01)

(56) References Cited

U.S. PATENT DOCUMENTS

| | | | | |
|---|---|---|---|---|
| 8,990,695 B2* | 3/2015 | Karachale | ............... | G06F 9/542 715/736 |
| 9,749,269 B2* | 8/2017 | Jung | ..................... | G06F 3/0482 |
| 2008/0168382 A1* | 7/2008 | Louch | .................. | G06F 9/4443 715/781 |
| 2008/0220752 A1* | 9/2008 | Forstall | .................. | H04M 1/56 455/415 |
| 2010/0095240 A1* | 4/2010 | Shiplacoff | ............ | G06F 3/0483 715/784 |
| 2010/0146384 A1* | 6/2010 | Peev | ...................... | H04M 1/673 715/255 |
| 2010/0146437 A1* | 6/2010 | Woodcock | ............ | G06Q 30/06 715/806 |
| 2010/0159995 A1* | 6/2010 | Stallings | ............... | G06F 3/0488 455/566 |
| 2010/0248689 A1* | 9/2010 | Teng | ....................... | H04M 1/67 455/411 |
| 2012/0169768 A1* | 7/2012 | Roth | ..................... | G06F 3/0485 345/629 |
| 2012/0272230 A1* | 10/2012 | Lee | ......................... | G06F 1/329 717/173 |
| 2012/0304118 A1* | 11/2012 | Donahue | .............. | G06F 3/04817 715/808 |
| 2012/0331548 A1* | 12/2012 | Tseng | ....................... | G06F 21/31 726/19 |
| 2013/0007665 A1* | 1/2013 | Chaudhri | .............. | G06F 9/4443 715/830 |
| 2013/0050250 A1* | 2/2013 | Brinda | .............. | H04M 1/72544 345/619 |
| 2013/0057587 A1* | 3/2013 | Leonard | ................ | G06F 3/0488 345/660 |
| 2013/0063443 A1* | 3/2013 | Garside | ................ | G06T 15/005 345/473 |
| 2013/0069962 A1* | 3/2013 | Nealer | ............. | H04M 1/72544 345/522 |
| 2013/0100044 A1* | 4/2013 | Zhao | ..................... | G06F 1/1694 345/173 |
| 2013/0219332 A1* | 8/2013 | Woley | ................... | G06F 1/3209 715/808 |
| 2013/0225238 A1* | 8/2013 | He | ........................ | G06F 1/3234 455/558 |
| 2013/0311920 A1* | 11/2013 | Koo | ..................... | G06F 3/04883 715/765 |
| 2014/0118272 A1* | 5/2014 | Gunn | .................... | G06F 3/0488 345/173 |
| 2014/0282084 A1* | 9/2014 | Murarka | ................ | H04L 51/32 715/752 |
| 2014/0289683 A1* | 9/2014 | Park | ...................... | G06F 3/0488 715/863 |
| 2014/0351268 A1* | 11/2014 | Weskamp | ............. | G06F 17/217 707/748 |
| 2015/0092520 A1* | 4/2015 | Robison | ................ | G04G 21/02 368/9 |
| 2016/0006678 A1* | 1/2016 | Jung | ...................... | G06Q 10/10 726/19 |
| 2016/0018914 A1* | 1/2016 | Kuo | ........................ | H04M 1/67 345/173 |
| 2016/0034133 A1* | 2/2016 | Wilson | .................. | G06F 3/0488 715/772 |
| 2016/0034424 A1* | 2/2016 | Won | ...................... | G06F 17/211 715/273 |
| 2016/0037481 A1* | 2/2016 | Won | ...................... | H04W 68/00 715/771 |
| 2016/0044091 A1* | 2/2016 | Doumet | ................ | H04L 67/10 715/745 |

FOREIGN PATENT DOCUMENTS

| | | |
|---|---|---|
| CN | 103092985 | 5/2013 |
| CN | 103164113 | 6/2013 |

* cited by examiner

METHOD FOR DISPLAYING INFORMATION, AND TERMINAL EQUIPMENT

CROSS REFERENCE TO RELATED APPLICATION

The present application is a continuation of International Application No. PCT/CN2017/071544, filed Jan. 18, 2017, which is a continuation-in-part of International Application No. PCT/CN2016/111825, filed Dec. 23, 2016. The entire contents of the above-referenced applications are incorporated into the present application by reference.

TECHNICAL FIELD

The present application relates to the technical field of terminal equipments, in particular to a method for displaying information, as well as a terminal equipment.

BACKGROUND

At present, with more and more powerful functions of a terminal equipment, users can use terminal equipments to perform a variety of operations, meanwhile, users rely more and more on the terminal equipments. For example, a user may lighten up the display screen of a terminal equipment frequently, but after the display screen is lightened up, the user does not necessarily perform other operations.

In other words, users may have some unscheduled spare time. In the existing terminal applications, such spare time of users cannot be utilized.

SUMMARY OF THE INVENTION

Embodiments of the present application aim to provide a method and device for displaying information as well as a terminal equipment, so as to improve the usage of spare time of users.

In order to achieve the above objective, embodiments of the present application disclose a method for displaying information, which comprising the steps of:

detecting whether a display screen of a terminal equipment switches to a screen-on state from a screen-off state when the display screen is in the screen-off state;

displaying at least one information card on the display screen after it is detected that the display screen switches to the screen-on state from the screen-off state, wherein the size of information card is smaller than that of the display screen, the information card includes information to be displayed.

In order to achieve the above objective, embodiments of the present application further disclose a device for displaying information, which comprising:

a detection module for detecting whether a display screen of a terminal equipment switches to a screen-on state from a screen-off state when the display screen is in the screen-off state;

a first display module for displaying at least one information card on the display screen after it is detected that the display screen switches to the screen-on state from the screen-off state, wherein the size of information card is smaller than that of the display screen, the information card includes information to be displayed.

In order to achieve the above objective, embodiments of the present application further disclose a terminal equipment, which comprising: a processor, a memory, communication interfaces, input/output interfaces and a bus, wherein the processor, the memory, the communication interfaces and the input/output interfaces are connected to the bus respectively, the memory being used for storing executable program codes; the processor executing programs corresponding to the executable program codes through reading the executable program codes stored in the memory, so as to perform the following steps:

detecting whether a display screen of a terminal equipment switches to a screen-on state from a screen-off state when the display screen is in the screen-off state;

displaying at least one information card on the display screen after it is detected that the display screen switches to the screen-on state from the screen-off state, wherein the size of information card is smaller than that of the display screen, the information card includes information to be displayed.

In order to achieve the above objective, embodiments of the present application further disclose an application program, which is used to perform the method for displaying information when being executed.

In order to achieve the above objective, embodiments of the present application further disclose a storage medium for storing an application program, which application program is used to perform the above method for displaying information when being executed.

By applying the embodiments of the present application, at least one information card is displayed on a display screen after it is detected that the display screen switches to a screen-on state from a screen-off state. The switch of the display screen to the screen-on state from the screen-off state indicates that a user may be in a spare state. In this case, target information potentially desired by the user is displayed in form of an information card, such that the user can browse the target information in spare time, thus increasing usage of the spare time of users.

Of course, the implementation of any of the products or method of the present application does not necessarily achieve all the above advantages at the same time.

BRIEF DESCRIPTION OF DRAWINGS

In order to describe the embodiments of the present application and the technical solutions in the prior art more clearly, drawings required for the embodiments of the present application and the prior art will be described briefly below. It is obvious that the drawings below only show some embodiments of the present application, and those skilled in the art can also obtain other drawings based on these drawings without any creative efforts.

DETAILED DESCRIPTION OF THE INVENTION

In order to make the objectives, technical solutions as well as advantages of the present application more apparent and understandable, the present application will be described in more detail below with reference to the appended drawings and embodiments. Obviously, the described embodiments are only some of the embodiments of the present application, rather than all of the embodiments. All other embodiments obtained based on the embodiments of the present application by those skilled in the art without doing any creative works fall into the protection scope defined by the present application.

In order to solve the above technical problem, embodiments of the present application provide a method and device for displaying information as well as a terminal equipment, the method and device are to be applied to a variety of terminal equipments such as mobile phones, tablets and the like.

Firstly, a method for displaying information provided by the embodiments of the application is described in detail below.

Figure 1:
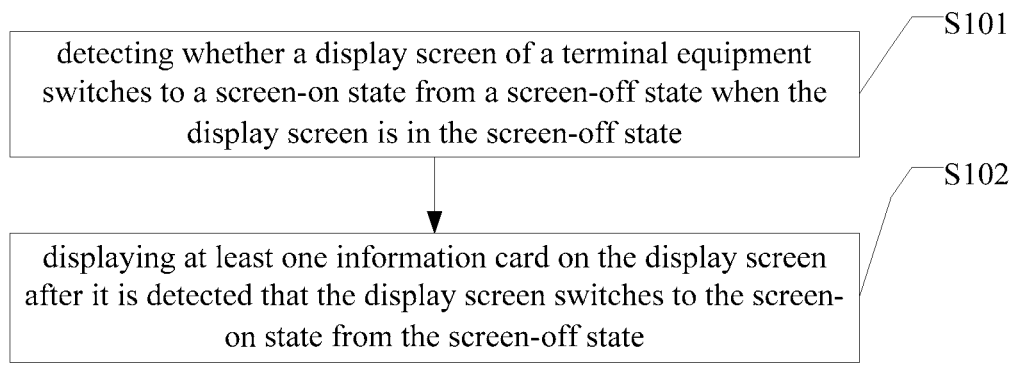
FIG. 1 is a first schematic flowchart of a method for displaying information provided by an embodiment of the present application.

FIG. 1 is a first schematic flowchart of a method for displaying information provided by an embodiment of the present application, which comprising:

S101: detecting whether a display screen of a terminal equipment switches to a screen-on state from a screen-off state when the display screen is in the screen-off state.

S102: displaying at least one information card on the display screen after it is detected that the display screen switches to the screen-on state from the screen-off state, wherein the size of information card is smaller than that of the display screen, the information card includes information to be displayed.

The information to be displayed can be obtained when the display screen is in the screen-off state. Specifically, the information to be displayed can be obtained from a local system of a terminal equipment; or the information to be displayed can be obtained from network side.

For example, the information to be displayed can be information for informative purpose or can be push information or prompt message of a third-party application program or can also be push information or prompt message of the system and the like, which is not limited in particular.

For example, if the information to be displayed is information for informative purpose, the information for informative purpose is obtained from application programs for informative purpose or from internet when the display screen of the terminal equipment is in the screen-off state.

Or, the information to be displayed can be generated, when the display screen of the terminal equipment is in the screen-off state and when receiving a chat message from a friend sent via the WeChat application, according to the identity of the friend and the contents of the chat.

Or, the information to be displayed can be generated, when the display screen of the terminal equipment is in the screen-off state and when receiving a prompt message regarding power or memory sent by the system, according to the prompt message.

The push information or prompt message from a third-party application program and the push information or prompt message from the system can be obtained from the local system of a terminal equipment. Information for informative purpose can be obtained from network side.

Moreover, there exist two scenarios of obtaining information for informative purpose from network side:

receiving information for informative purpose to be displayed sent by a network-side server; or obtaining information for informative purpose from a network-side server according to a user instruction.

For example, a network-side server can push information for informative purpose to a terminal equipment for every preset period, such that the terminal equipment can obtain the information for informative purpose to be displayed.

Or, when a user enters "weather" at the search entry of an information card, the terminal will then obtain information for informative purpose related to "weather" from the network-side server as the information for informative purpose to be displayed.

Specifically, an information card, which contains the obtained information to be displayed, can be displayed immediately after it is detected that the display screen is lightened up. An information card can also be displayed after a preset duration has elapsed, such as is later or 2 s later and so on, after it is detected that the display screen is lightened up.

For ease of description, the information to be displayed, which is contained in an information card, is referred to as target information.

In the above progress of obtaining the information to be displayed (target information), if a plurality of pieces of target information are obtained, the information to be displayed in a current information card can be determined among the obtained target information, which is referred to as current target information. The current target information can be interpreted as the target information to be displayed to users in the first place. The content in which a user is interest can be preferentially determined as the current target information based on user preferences; or important information, such as prompt message from the system and the like, can also be determined as the current target information such that the user will process the important information with priorities; or the target information with the highest relevancy to the display instruction input by the user can also be determined as the current target information.

That is, priority rules can be set according to actual situations and then the current target information can be determined according to the priority rules. The information card, which contains the above determined current target information, is displayed after receiving a display instruction.

In the embodiments shown in the present application, an information card can be interpreted as a combined carrier for information control and information display, which provides an interface for information control and information display. Specifically, the above information card can be used only for information display, and can also be used for both information display and information input, which is not limited by the application. An information card can be a rectangle of a preset size or other shape, wherein the size and shape of an information card can be set according to the display screen of a terminal equipment. It should be noted that the size of information card is smaller than that of the display screen. As shown in FIG. 2_a_, the information card does not cover the entire display screen. This information card can be referred to as a large card.

As an embodiment, a prompt information can be displayed in a preset position on the display screen, the prompt information being used for prompting the presence of other information cards.

That is, when multiple pieces of target information are obtained and there are multiple information cards, prompt information can be displayed in a preset position on the display screen, so as to remind a user that there are other pieces of browsable target information.

Specifically, the prompt information can be a prompt symbol of arrow shape or a prompt card in a card form. The prompt card can be a card of a size smaller than that of the information card, for example, a card with a width narrower than that of the information card and/or a card with a height smaller than that of the information card. Partial content of the target information can be displayed in this prompt card, or the prompt card does not display the content of target information, both of which can play a role in prompting THE user.

As an embodiment, a prompt card can be displayed on a left boundary and/or a right boundary of the display screen, wherein the size of the prompt card is set according to the remaining size of the display screen, the remaining size being the size obtained by subtracting the size of the information card from the size of the display screen.

Figure 2A:
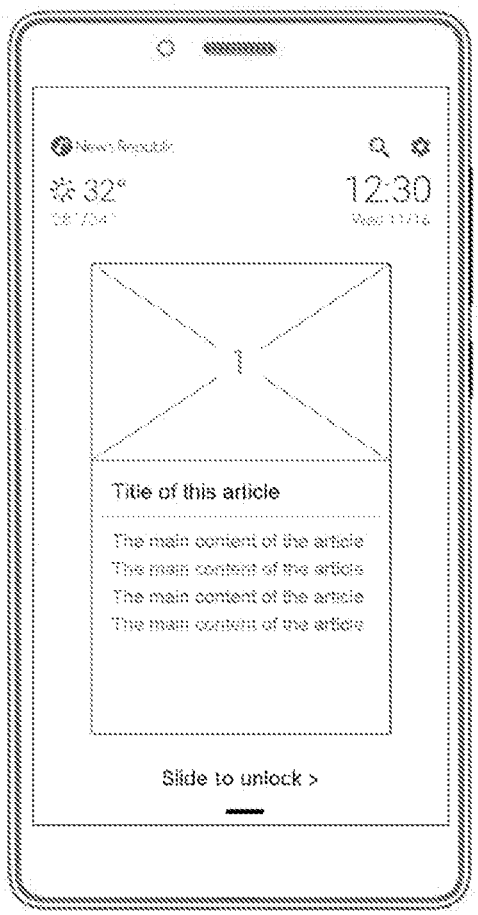
FIGS. 2a-2d are schematic views of interfaces of the information display interfaces provided by an embodiment of the present application.
Figure 2B:
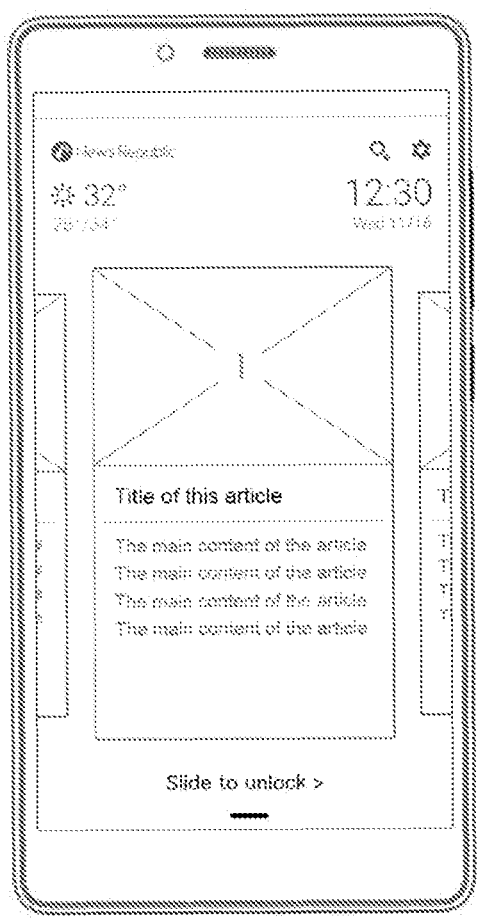
Figure 2C:
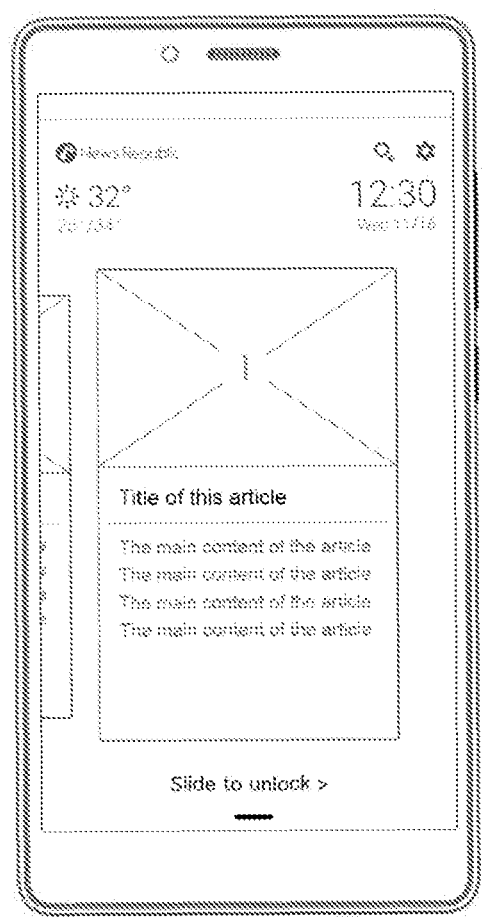
Figure 2D:
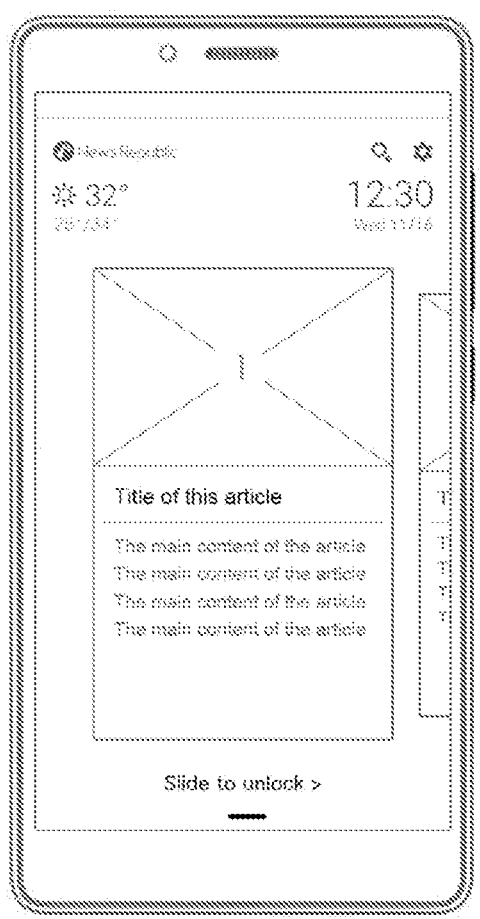
Figure 2E:
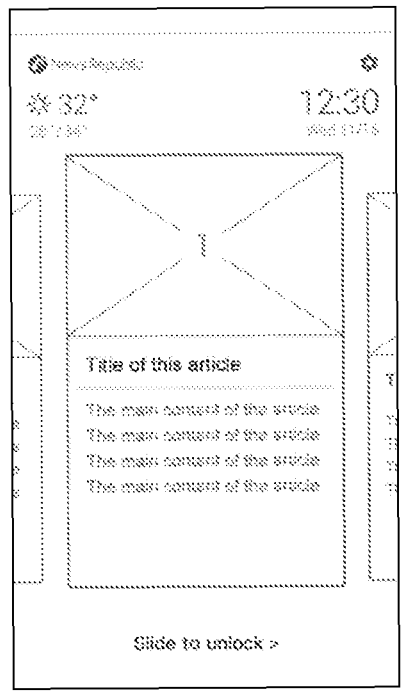
FIGS. 2e-2m are line drawings of the information display interfaces provided by an embodiment of the present application.
Figure 2F:
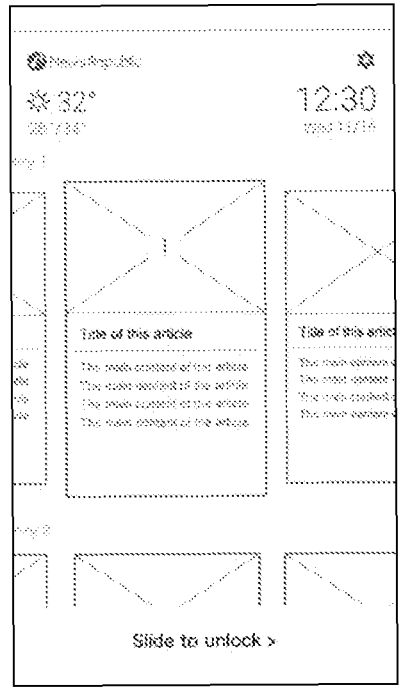
Figure 2G:
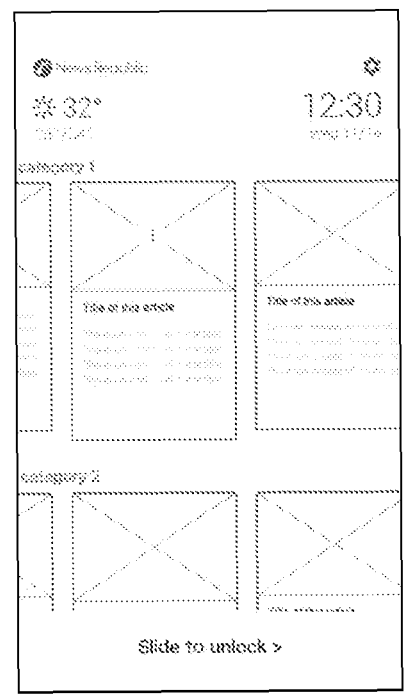
Figure 2H:
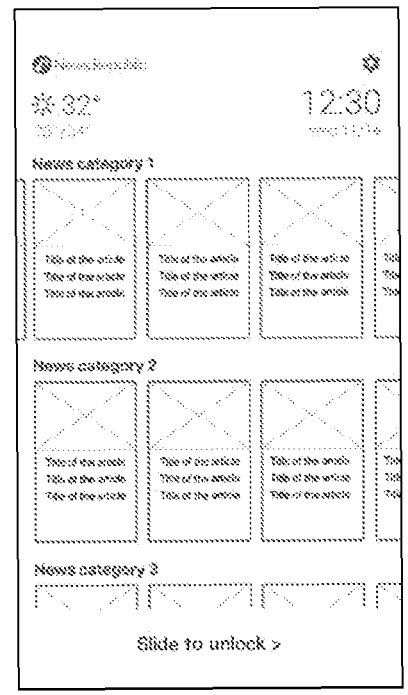

As shown in FIG. 2b, prompt cards are displayed on both the left boundary and the right boundary of the display screen. As shown in FIG. 2c, a prompt card is displayed only on the left boundary of the display screen and as shown in FIG. 2d, a prompt card is displayed only on the right boundary of the display screen, which is not limited specifically.

As an embodiment, the information card can comprise a multimedia resource display area and/or a text area, wherein the multimedia resource display area is used for displaying multimedia resource information and the text area is used for displaying text information.

The multimedia resource display area can contain pictures, videos and the like. If the information card contains information for informative purpose, the multimedia resource display area can display pictures related to the information for informative purpose while the text area can display the summary content of the information for informative purpose. If the information card contains a message from a friend sent via the WeChat application, the multimedia resource display area can display the avatar of the friend, background pictures and the like while the text area can display chat contents.

When the information card contains both the multimedia resource display area and the text area, the two areas can be arranged vertically or horizontally, which is not specifically limited.

During the usage of a terminal by a user, in a first case, the terminal is not set in a locked-screen state for ease of operation; in a second case, the terminal is set in the locked-screen state in view of the factors of personal privacy, prevention of mis-operation and the like. In both cases, the display screen may switch to the screen-on state from the screen-off state.

Wherein in the second case, the condition that a display screen switches to the screen-on state from the screen-off state is as follows:

A user does not carry out any operations to the terminal after the display screen is in the screen-on state (for example, the user concentrates on reading the text displayed on the display screen without performing any operation to the terminal). Taking into account of saving power and other factors, generally, the display screen is switched to the screen-off state from the screen-on state first, whereas in this case, the user may need to perform further operations to the terminal. In order to prevent unlocking the terminal frequently, the terminal is generally locked only after a period since the display screen is in the screen-off state. At this moment, the user can trigger the display screen to switch to the screen-on state from the screen-off state by an operation of touching the display screen and the like. In this case, users usually would like to see the content displayed on the display screen before the display screen went off. It may trouble the users to display other contents at this moment, thus degrading the user experience.

Therefore, based on the above conditions, in a specific embodiment of the present application, whether the display screen switches to the screen-on state from the screen-off state can be detected when the terminal is in the locked-screen state.

Because users usually lock the terminal in the condition that they do not need to perform operations to the terminal, it will not cause troubles to the users by applying the solution provided by the embodiments of the application to display information to the users only when it is detected that the display screen is lightened up in the case that the display screen is in the locked-screen state; on the contrary, it can provide more abundant information to the users such that the spare time of the users becomes well used.

As an embodiment, the current target information is displayed in form of a card with a desktop as its background when the information displayed in the information card is the information corresponding to the system;

the current target information is displayed in form of a card with a third-party application program interface as its background when the information displayed in the information card is the information corresponding to the third-party application program.

It can be understood that the background of the information card can be the same as the desktop if the information displayed in the information card is push information or prompt message of the system; the background of the information card can be the same as the interface of the WeChat application program if the information displayed in the information card is push information or prompt message of the WeChat application program; the interface design is more reasonable in this way.

Generally, if the terminal equipment is a cell phone, since the display screen thereof is smaller, only one information card can be displayed. If the terminal equipment is a tablet, since the display screen thereof is larger, more information cards can be displayed. When the number of information cards is greater than 1, each information card can be displayed in horizontal arrangement on the display screen, or each information card can be arranged according to the actual size of the terminal.

By applying the embodiment of the application shown in FIG. 1, at least one information card is displayed on a display screen after it is detected that the display screen switches to a screen-on state from a screen-off state. The switch of the display screen to the screen-on state from the screen-off state indicates that a user may be in a spare state. In this case, target information potentially desired by the user is displayed in the form of an information card, such that the user can browse the target information with spare time, thus increasing usage of the spare time of users.

Figure 3:
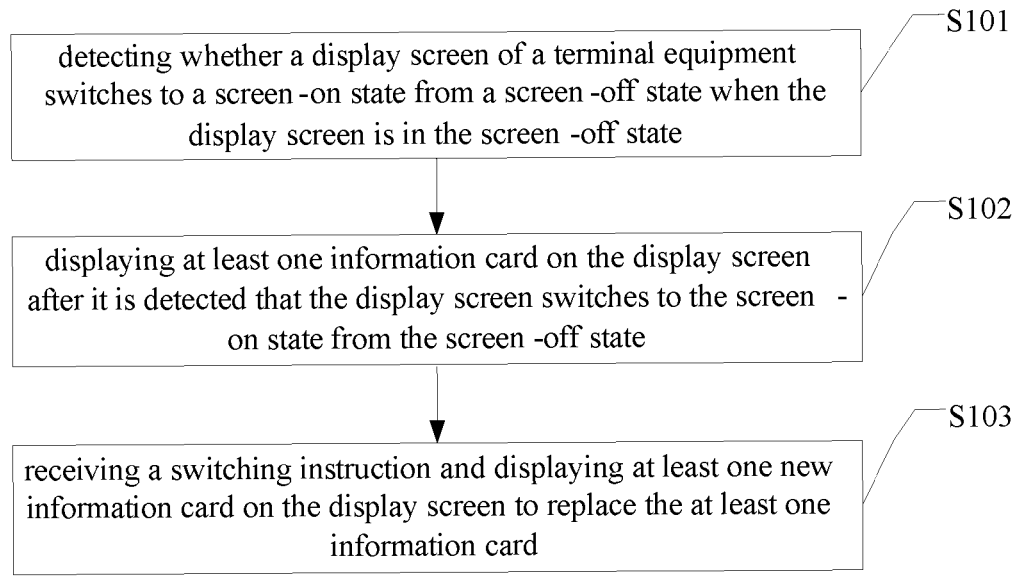
FIG. 3 is a second schematic flowchart of a method for displaying information provided by an embodiment of the present application.

FIG. 3 is a second schematic flowchart of the method for displaying information provided by an embodiment of the present application. The embodiment shown in FIG. 3 of the application incorporates following steps after S102 on the basis of the embodiment shown in FIG. 1:

S103: receiving a switching instruction and displaying at least one new information card on the display screen to replace the at least one information card.

It should be noted that there can be several ways to switch from the information card previously displayed to the new information card, such as, the new information card can replace the previous card directly in a preset switching manner; or the new information card can replace the previous information card in a built-in switching manner.

The above preset switching manner can be to display the target information after switched directly, to display the target information after switched in an explosive manner, to display the target information after switched in a manner of moving slowly from above to below and the like.

The above built-in switching manner can be to slide inward linearly, to slide inward according to a preset curve line, to fly inward and the like.

As an embodiment, the switching instruction can comprise sliding leftwards or sliding rightwards;

if the switching instruction is to slide rightwards, at least one new information card is moved into the display screen from left to right when moving the at least one information card rightwards out of the display screen;

if the switching instruction is to slide leftwards, at least one new information card is moved into the display screen from right to left when moving the at least one information card leftwards out of the display screen.

Or the switching instruction can comprise sliding upwards or sliding downwards;

if the switching instruction is to slide downwards, at least one new information card is moved into the display screen from up to down when moving the at least one information card downwards out of the display screen;

if the switching instruction is to slide upwards, at least one new information card is moved into the display screen from down to up when moving the at least one information card upwards out of the display screen.

In this switching manner, i.e. a correlated movement of a previously displayed information card and a new information card, the new information card moves into the display screen while the information card previously displayed moves out of the display screen.

It should be noted that the switching instruction can be a switching instruction by receiving the input from users, or can also be a switching instruction generated according to a predefined rule.

It can be understood that a user can slide leftwards and rightwards or slide upwards and downwards on a display screen; it may indicate that a switching instruction is received if the operation of sliding leftwards and rightwards or sliding upwards and downwards by a user is detected.

Or a predefined rule can be set. For example, a switching instruction is received to switch the information card after the information card has been already displayed for a preset duration. Specifically, a timer can be started in the information card which displays information; the switching instruction is considered as received when the timer reaches the set duration, in which case the information card will be switched.

If the above switching instruction comprises sliding leftwards and rightwards, correspondingly, the information card can be displayed in a manner that at least one information card is arranged horizontally on the display screen. It can be understood that sliding leftwards and rightwards conforms to the usage habit of users when the information card is arranged horizontally.

By applying the embodiment shown in FIG. 3 of the present application, a terminal equipment can further switch an information card after receiving a switching instruction, so as to display more information to users.

In the embodiments shown in the application, users can not only browse information cards, but also conduct other operations to the information cards, such as zooming in, zooming out, deleting, flipping over and the like.

As an embodiment, a first interaction instruction for the information card can be received and an operation corresponding to the first interaction instruction can be performed.

Figure 4:
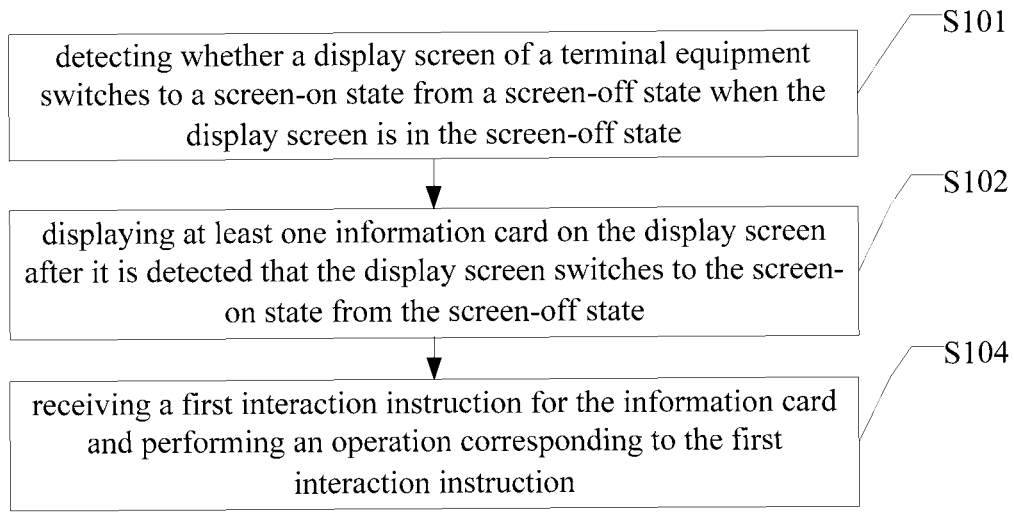
FIG. 4 is a third schematic flowchart of a method for displaying information provided by an embodiment of the present application.

As the embodiment shown in FIG. 4, which is a third schematic flowchart of the method for displaying information provided by an embodiment of the present application, wherein the following steps are incorporated after S102:

S104, receiving a first interaction instruction for the information card and performing an operation corresponding to the first interaction instruction.

As an embodiment, the first interaction instruction can be an instruction of moving out a card. The step of performing an operation corresponding to the first interaction instruction can comprise moving the information card upwards or downwards out of the display screen.

A delete button can be set in the information card, and it indicates that the instruction of moving out a card is received if it is detected that the user clicks the delete button. Or the instruction of moving out a card can be a preset gesture of users, and it indicates that the card instruction of moving out a card is received if the preset gesture of users is detected.

If only one information card is currently displayed on the display screen, the information card can be directly moved upwards or downwards out of the display screen. If several information cards are currently displayed on the display screen, the information card to be deleted, to which the instruction of moving out a card corresponds, can be determined and then the determined information card to be deleted is moved upwards or downwards out of the display screen.

It should be noted that, if a user moves an information card out of the display screen, it indicates the user is not interest in the information displayed in the information card. Thus, this kind of information can be marked, and then, upon displaying information cards, this kind of information card can be deleted or is not generated any more.

By applying the embodiment, the information card can be moved out of the display screen according to the instruction of users, and thereby the kind of information in which users are not interested is recorded, to avoid displaying this kind of information card again during the subsequent process of displaying information, improving the user experience.

As an embodiment, the first interaction instruction can be an instruction of flipping over a card. The step of performing an operation corresponding to the first interaction instruction can comprise:

flipping over the information card and displaying related information of the information to be displayed, which is contained in the information card, on the back of the information card.

A flipping-over button can be set in the information card, and it indicates that the instruction of flipping over a card is received if it is detected that a user clicks the flipping-over button. Or the instruction of flipping over a card can be a preset gesture of users, and it indicates that the instruction of flipping over a card is received if the preset gesture of users is detected.

It is the back of the information card that is displayed after the information card is flipped over. The information contained on the back of the information card can be associated with the information contained in the front thereof.

For example, if the information contained on the front of the information card is information for informative purpose, then the information contained on the back of the information card can be comment information associated with the information for informative purpose, information for informative purpose associated with the information for informative purpose, or advertisement and the like, which is not limited specifically.

If the information contained on the front of the information card is a message from a friend sent via WeChat application program, the information contained on the back thereof can be the identity information of said friend.

According to the above description, an information card can contain a multimedia resource display area and a text area, the multimedia resource display area being used for displaying multimedia resource information and the text area being used for displaying text information. In this case, when the information card is flipped over, it is possible to only flip over the text area while the multimedia resource display area is not flipped over. The text information related to the text information of the text area is displayed on the back of the information card.

For example, the information card contains information for informative purpose, the multimedia resource display area displays related pictures of the information for informative purpose, the text area displays the summary content of the information for informative purpose, and the text area on the back of the information card displays the comment information for the information for informative purpose. When the information card is flipped over, only the text area is flipped, whereas the multimedia resource display area remains the same, such that users can see pictures when browsing comment information, and thus the design is more reasonable.

By applying the embodiment of the application, more information can be displayed on the back of the information card through flipping over the information card; on the other hand, user experience is better through adding the function of flipping over a card.

As an embodiment, the first interaction instruction can be an instruction of adjusting card size. The step of performing an operation corresponding to the first interaction instruction can comprise:

adjusting the size of an information card on the display screen.

A size-enlarging button, a size-reducing button and the like can be set in the information card, or a corresponding relationship between a gesture of users and an instruction can be preset. For example, it denotes the size-reducing instruction if a user conducts a pinch-in gesture, and it denotes the size-enlarging instruction if a user conducts a pinch-out gesture, which is not limited specifically.

It can be regarded as that an instruction of adjusting card size is received when it is detected that a user clicks the size-enlarging button in the information card or the pinch-out gesture of a user is detected. In this case, the size of information card can be enlarged, and correspondingly, characters and pictures contained in the information card can also be enlarged in the same proportion.

Similarly, it can be regarded as that an instruction of adjusting card size is received when it is detected that a user clicks the size-reducing button in the information card or the pinch-out gesture by a user is detected. In this case, the size of information card can be reduced, and correspondingly, the size of characters and pictures contained in the information card can also be reduced in the same proportion.

As an embodiment, the first interaction instruction is an instruction of adjusting the number of cards. The step of performing an operation corresponding to the first interaction instruction can comprise:

adjusting the number of the information cards on the display screen.

A button of "number of cards" or other similar buttons can be set in the information card or in other position on the display screen, such that users can adjust the number of information cards on the display screen through the button.

According to the above description, the number of information cards can be greater than 1. In this case, users can further rearrange the several information cards.

Specifically, a user can click the rearrangement button in the information card and choose the information card to be rearranged and the position after rearrangement. Or the user can use a preset gesture on the display screen to arrange the information cards. In both cases, the terminal equipment can rearrange each of the displayed information card according to the arrangement information (the information card to be arranged and the position thereof after rearrangement) carried in an arrangement request.

As an embodiment, the first interaction instruction can be an instruction of adjusting information state. The step of performing an operation corresponding to the first interaction instruction can comprise:

adjusting the display state of information in the information card.

The display state of the information in the above information card can comprise the size of characters and pictures of the information displayed in the information card, or can comprise a folded display or an unfolded display of the displayed content.

In the present embodiment, characters and pictures in the information card can be zoomed in without changing the size of information card.

In the present embodiment, a zooming-in button, a zooming-out button and the like can be set in the information card, or a corresponding relationship between a gesture of users and an instruction can be set in advance. For example, it denotes a zooming-in instruction if a user conducts a pinch-in gesture, and it denotes a zooming-out instruction if a user conducts a pinch-out gesture, which is not limited specifically.

It can be regard as that the instruction of adjusting information state is received when it is detected that a user clicks the zooming-in button in the information card or the pinch-in gesture of a user is detected. In this case, the enlarged current target information can be determined and displayed.

Since in the present embodiment, the size of an information card remains the same and the content arrangement displayed in the information card is to vary after texts and pictures in the information card are zoomed in, the current target information after zoomed in can be re-determined and displayed.

For example, if the enlarged font size is 10pt, it is determined that the number of words which can be displayed in the information card is 100, and then the 100 words are displayed in an arrangement.

Similarly, it can be regarded as that an instruction of adjusting information state sent by a user is received when it is detected that the user clicks the zooming-out button in the information card or a pinch-out gesture of a user is detected. In this case, the current target information after zoomed out can be determined and displayed.

Since in the present embodiment, the size of an information card remains the same and the content arrangement displayed in the information card is to vary after texts and pictures in the information card are zoomed out, the current target information after zoomed out can be re-determined and displayed.

For example, if the font size before zoomed out is 8pt and the number of words which can be displayed in the information card is 200, the font size after zoomed out is 6pt and the number of words which can be displayed in the information card is 400, and then target information can be re-obtained. The re-obtained target information content can be more than previous target information, and the information card is re-generated according to the re-obtained target information, wherein the regenerated main card can contain 400 words.

In the present embodiment, an "unfold the content" button and a "fold" button or other similar buttons can be set in the information card, such that a user can adjust the display state of an information card on the display screen through said button.

For example, if the information contained in an information card is a prompt message sent by WeChat application program, which prompt message carries friend circle information published by a friend and the friend circle information contains a lot of content, then the display state can be divided as a folded display and an unfolded display. A user can browse the complete content of the friend circle information through the "unfold the content" button when the friend circle information is folded-displayed; and a user can switch the display state of the friend circle information to a folded display through the "fold" button when the friend circle information is unfolded-displayed.

By applying the above embodiment, the information card can be enlarged or reduced, and each information card can also be adjusted regarding the number thereof or be rearranged, and the information in information cards can also be adjusted, such that the user experience is improved.

As an embodiment, the first interaction instruction can be an instruction of displaying related information. The step of performing an operation corresponding to the first interaction instruction can comprise:

displaying information related to the information card in a new window of the display screen.

For example, the information displayed in an information card is target information for informative purpose, which only contains pictures and the summary of texts, a "read more" prompt button and the like can be set in the information card. After a user clicks said prompt button (receiving an instruction of displaying related information), the corresponding application program interface appears (a new window on the display), i.e. an interface of an application program for informative purpose, such that the user can browse more information for informative purpose.

As an embodiment, a second interaction instruction can be also received, the second interaction instruction being an instruction for a new window of the display screen; the information corresponding to the second interaction instruction is displayed.

As an extension of the above example, after jumping to the interface of an application program for informative purpose, the interaction instruction for the application program interface can be further received. For example, after the instruction to display other information for informative purpose in the application program interface is received, other information for informative purpose corresponding to said instruction is displayed.

By applying the above embodiment, a user can browse more information by card jumping to a new interface, thereby improving the ease of a user's operation.

As an embodiment, the first interaction instruction can be a layout adjusting instruction. The step of performing an operation corresponding to the first interaction instruction can comprise:

obtaining at least two summary cards to be displayed, and replacing the information card currently being displayed with the at least two summary cards.

Wherein, the summary card is the above information card of a reduced size, in which the summary content of the target information can be displayed. The summary content of each piece of target information can be the entire target information, or can be a part of the target information, which is not limited by the present application.

Specifically, according to several pieces of target information obtained by a terminal equipment, the summary content of these several pieces of target information is displayed in several summary cards correspondingly. In each summary card, the summary content of one piece of target information is displayed, in which the information can be displayed in a zoomed-out manner, or can be displayed according to a preset interface layout manner. For example, pictures and texts are displayed on the left side and right side of a summary card respectively.

In an embodiment of the application, the at least two summary cards can be arranged in a spaced manner. In this case, these summary cards can be uniformly arranged in an equally spaced manner or can also be non-uniformly arranged in an unequally spaced manner, which is not limited by the application herein.

It can be understood by those skilled in the art that target information obtained by a terminal equipment can belong to different types of information according to different classification perspectives. For example, if the target information is information for informative purpose obtained from network side, then the target information can be classified according to a perspective of information for informative purpose, such as sports information, entertainment information, news information and the like; if the target information is obtained from a third-party application or from the system, then the target information can be classified with application identifiers, such as WeChat, system information and the like. Based on this, when the above at least two summary cards are uniformly arranged in the equally spaced manner, the summary cards can form a summary card row when viewed horizontally and the summary cards can form a summary card column when viewed vertically. On this basis, one row or one column of summary cards can correspond to one type of information, such that a user can find the summary card corresponding to the desired application program according to the classification easily.

Specifically, the maximum number of the summary cards contained in each summary card row and/or each summary card column displayed on the display screen can be preset, for example, 3, 4, 5 and the like.

Assume that one row of summary cards corresponds to one type of information and the preset maximum number of the summary cards contained in one row of summary cards displayed on the display screen is: 4.

If the type of information is classified according to application identifiers, then the number of summary cards corresponding to each type of information and the number of summary cards in the summary card row displayed on the display screen are as follows respectively:

the number of summary cards corresponding to system information is: 4, and the number of the summary cards displayed in the row is 4;

the number of summary cards corresponding to WeChat is: 3, and the number of summary cards displayed in the row is 3.

If the type of information is classified according to a perspective of information for informative purpose, then the number of summary cards corresponding to each type of information and the number of summary cards in the summary card row displayed on the display screen are as follows respectively:

the number of summary cards corresponding to sports information is: 4, and the number of summary cards displayed in the row is 4;

the number of summary cards corresponding to entertainment information is: 3, and the number of summary cards displayed in the row is 3;

the number of summary cards corresponding to news information is: 2, and the number of summary cards displayed in the row is 2.

It can be seen from the above that the number of the summary cards displayed in each row will be less than or equal to the preset maximum number of the summary cards contained in a row.

Moreover, an information type identifier can be displayed in a preset position when one row or one column of summary cards corresponds to one type of information. For example, the information type identifier is displayed in the upper left corner of a row of summary cards, or the information type identifier is displayed in the top end of a column of summary cards, etc.

Specifically, see FIGS. 2e-2h, which show the process of at least two summary cards replacing the information card currently being displayed in line drawings of interfaces. As can be seen from the four line drawings, after a layout adjusting instruction is received, the size of the information card currently being displayed is reduced gradually and finally the information card currently being displayed becomes the summary card to which it corresponds, while other summary cards gradually enter the display screen, and finally the summary card of the information card currently being displayed is displayed along with other summary cards. It should be noted that the process shown in FIGS. 2e-2h is only the case that the information card currently being displayed is replaced with at least two summary cards, and the specific realization form of the replacement process is not limited by the application.

In another embodiment of the application, the at least two summary cards can be displayed in at least one column as a summary card queue, wherein summary cards in the summary card queue are arranged in a non-overlapping manner;

the above at least two summary cards can also be displayed in at least one row of summary card queue.

Specifically, the summary card queue contains at least one summary card. Each summary card in a same summary card queue can be equally spaced arranged in a non-overlapping manner or can also be non-equally spaced arranged in a non-overlapping manner.

Specifically, see FIGS. 2i-2m, which show the process of at least two summary cards replacing the information card currently being displayed in line drawings of interfaces. As seen from the five line drawings, after a layout adjusting instruction is received, the information card currently being displayed in a horizontal arrangement gradually becomes a summary card, and then becomes vertically arranged summary cards in an overlapping manner. The size of the summary cards are gradually reduced in the process of overlapping transformation and the information cards not being currently displayed gradually enter the display screen.

Figure 2I:
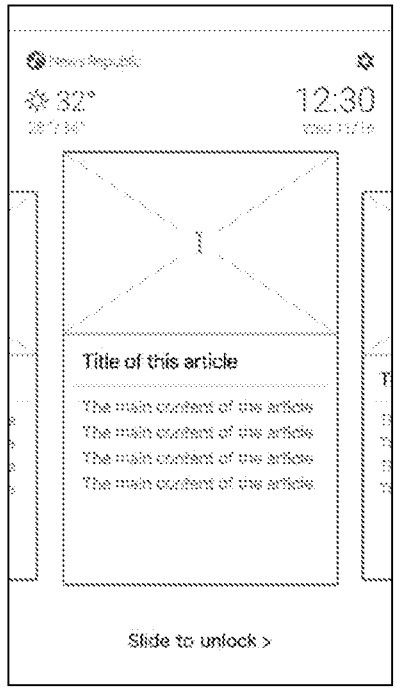
Figure 2J:
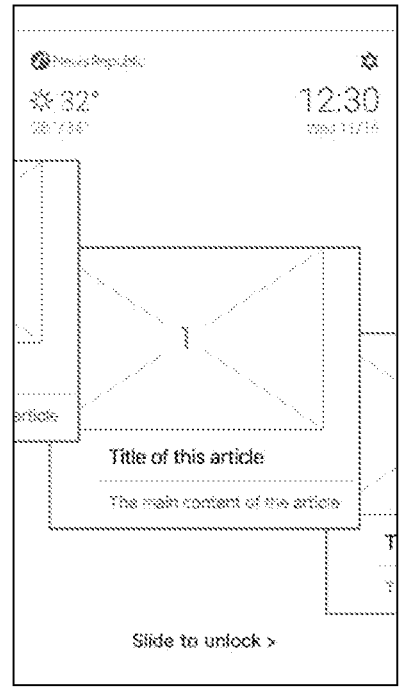
Figure 2K:
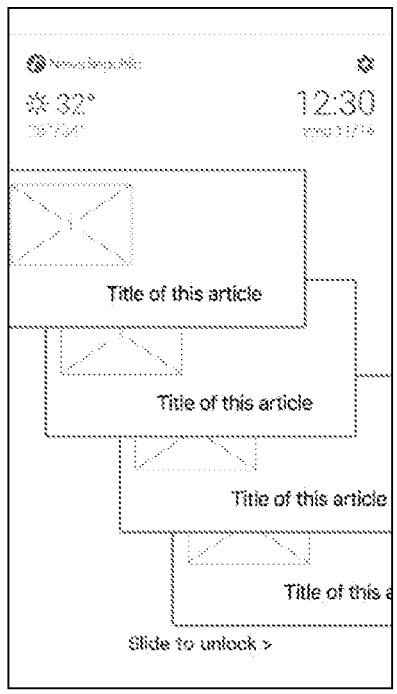
Figure 2L:
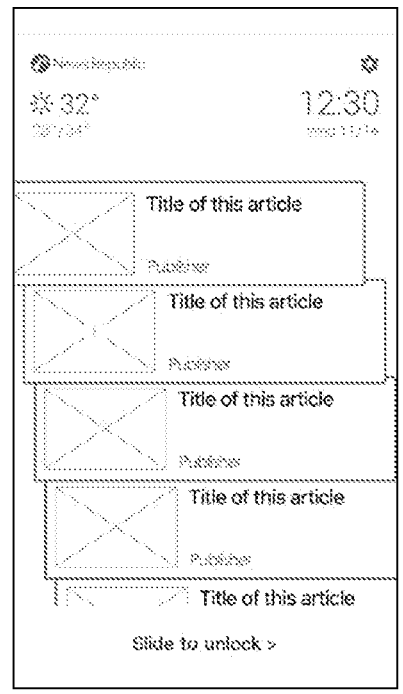
Figure 2M:
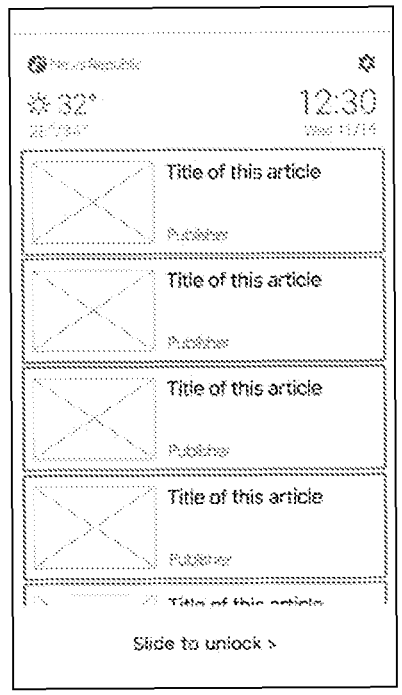

By comparing FIGS. 2i and 2m, it can be seen that the content of the summary cards is only a part of the content in the information card and the arrangement of the images and text in the summary card is changed with respect to the arrangement of the images and text in the information card, which is changed from a vertical arrangement to a horizontal arrangement.

It should be noted that the process shown in FIGS. 2i-2m is only the case that the information card currently being displayed is replaced with at least two summary cards, and the specific realization form of the replacement process is not limited by the application.

The process in which the display of information cards is changed to the display of summary cards after receiving a layout adjusting instruction (which is referred to as the first layout adjusting instruction below) is described above. Specifically, the display of summary cards can also be changed to the display of information cards through receiving another layout adjusting instruction (which is referred to as the second layout adjusting instruction below). Optionally, when the display of summary cards is changed to the display of information cards, the information card displayed can be the one before changed to the display of summary cards, or it can be the information card corresponding to the summary card currently selected by a user, which is not limited by the application.

When changing the layout, the above first layout adjusting instruction can be an instruction generated through detecting a pinch-out gesture. In this case, after the display of summary cards is changed to the display of information cards, the displayed information cards contain the information card displayed before the summary cards are displayed. Moreover, the above second adjusting instruction can be an instruction generated through detecting that a user clicks a summary card. In this case, after the display of summary cards is changed to the display of information cards, the displayed information cards contain the information card corresponding to the summary card clicked by the user.

Corresponding to the above embodiments of method, the present application further provides a device for displaying information.

Figure 5:
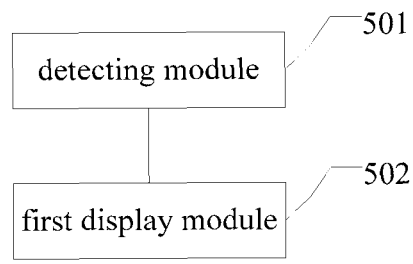
FIG. 5 is a schematic structural diagram of a device for displaying information provided by an embodiment of the present application.

FIG. 5 is a schematic structural diagram of a device for displaying information provided by an embodiment of the present application, which comprises:

a detecting module 501 for detecting whether a display screen switches to a screen-on state from a screen-off state when a terminal equipment is in the screen-off state;

a first display module 502 for displaying at least one information card on the display screen after the detecting module 501 detects that the display screen switches to the screen-on state from the screen-off state, wherein the size of information card is smaller than that of the display screen, the information card includes information to be displayed.

In the present embodiment, the detecting module 501 can be specifically used for:

detecting whether the display screen switches to the screen-on state from the screen-off state when the terminal equipment is in the screen-off state and the locked-screen state.

In the present embodiment, the device can further comprise:

a switching module (not shown in the figures) for receiving a switching instruction and displaying at least one new information card on the display screen to replace the at least one information card.

In the present embodiment, the switching instruction can be a switching instruction input by a user or a switching instruction generated according to a predefined rule.

In the present embodiment, the switching module can be specifically used for:

moving the at least one new information card into the display screen from left to right when the at least one information card is moved rightwards out of the display screen, if the switching instruction is to slide rightwards;

moving the at least one new information card into the display screen from right to left when the at least one information card is moved leftwards out of the display screen, if the switching instruction is to slide leftwards.

In the present embodiment, the device can further comprise a first obtaining module and a second obtaining module (not shown in figures), wherein the first obtaining module is used for obtaining the information to be displayed from a local system of the terminal equipment;

the second obtaining module is used for obtaining the information to be displayed from network side.

In the present embodiment, the second obtaining module can be specifically used for:

receiving information for informative purpose to be displayed sent by a network-side server; or obtaining information for informative purpose from a network-side server according to a user instruction.

In the present embodiment, the device can further comprise:

a second display module (not shown in the figures) for displaying prompt information in a preset position on the display screen, the prompt information being used for prompting the presence of other information cards.

In the present embodiment, the second display module can be specifically used for:

displaying a prompt card on a left boundary and/or a right boundary of the display screen, wherein the size of the prompt card is set according to the remaining size of the display screen, the remaining size being the size obtained by subtracting the size of the information card from the size of the display screen.

In the present embodiment, the first display module 502 can be specifically used for:

displaying the information cards on the display screen in a manner in which at least one information card is arranged horizontally, after the detecting module 501 detects that the display screen switches to the screen-on state from the screen-off state.

In the present embodiment, the device can further comprise a first receiving module and a performing module (not shown in figures), wherein the first receiving module is used for receiving a first interaction instruction for the information card;

the performing module is used for performing an operation corresponding to the first interaction instruction.

In the present embodiment, the first interaction instruction is an instruction of moving out a card. The performing module can be specifically used for:

moving the information card upwards or downwards out of the display screen;

or the first interaction instruction is an instruction of flipping over a card, the performing module being specifically used for:

flipping over the information card and displaying related information of the information to be displayed which is contained in the information card on the back of the information card.

In the present embodiment, when the information card comprises a multimedia resource display area and a text area, and the first interaction instruction is an instruction of flipping over a card, the performing module can be specifically used for:

flipping over the text area of the information card to the back of the information card and displaying related text information of the text information in the text area on the back of the information card.

In the present embodiment, the first interaction instruction is an instruction of adjusting card size. The performing module can be specifically used for:

adjusting the size of the information card on the display screen;

or the first interaction instruction is an instruction of adjusting the number of cards, the performing module being specifically used for:

adjusting the number of the information cards displayed on the display screen;

or the first interaction instruction is an instruction of adjusting information state, the performing module being specifically used for:

adjusting the display state of information in the information card.

In the present embodiment, the first interaction instruction is an instruction of displaying related information. The performing module can be specifically used for:

displaying information related to the information card in a new window of the display screen.

In the present embodiment, the device can further comprise a second receiving module and a third display module (not shown in figures), wherein the second receiving module is used for receiving a second interaction instruction, the second interaction instruction being an instruction for a new window of the display screen;

the third display module is used for displaying information corresponding to the second interaction instruction.

In the present embodiment, the first interaction instruction is a layout adjusting instruction. The performing module can be specifically used for:

obtaining at least two summary cards to be displayed, wherein the content of each summary card is determined according to information obtained from a program of the terminal equipment, the at least two summary cards comprise a summary card of the information card currently being displayed.

replacing the information card currently being displayed with the at least two summary cards.

In the present embodiment, the at least two summary cards are arranged in a spaced manner.

In the present embodiment, the at least two summary cards are uniformly arranged in an equally spaced manner; one row or one column of summary cards corresponds to one type of information.

In the present embodiment, the at least two summary cards are displayed in at least one column as a summary card queue, wherein summary cards in the summary card queue are arranged in a non-overlapping manner; or the at least two summary cards are displayed in at least one row as a summary card queue.

By applying the embodiments of the present application shown in FIG. 5, at least one information card is displayed on a display screen after it is detected that the display screen switches to a screen-on state from a screen-off state. The switch of the display screen to the screen-on state from the screen-off state indicates that a user may be in a spare state. In this case, target information potentially desired by the user is displayed in form of an information card, such that the user can browse the target information with spare time, thus increasing usage of the spare time of users.

Figure 6:
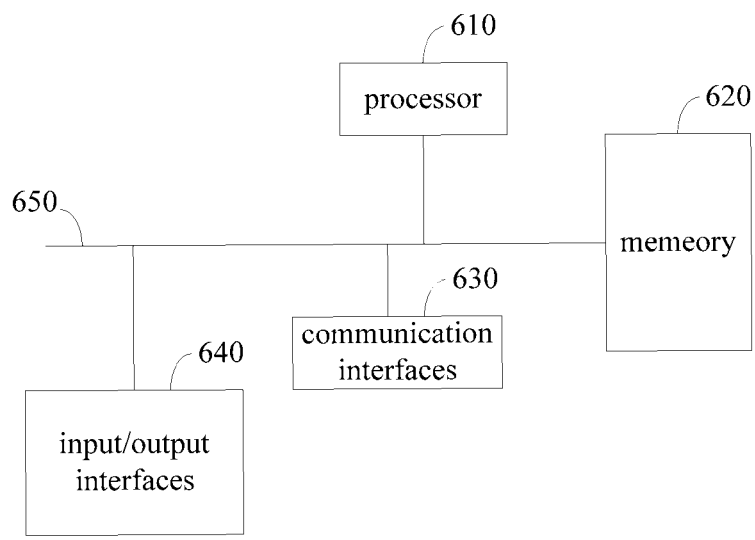
FIG. 6 is a schematic structural diagram of a terminal equipment provided by an embodiment of the present application.

Embodiments of the present application further provide a terminal equipment. As shown in FIG. 6, the terminal comprises: a processor 610, a memory 620, communication interfaces 630, input/output interfaces 640 and a bus 650, wherein the processor 610, the memory 620, the communication interfaces 630 and the input/output interfaces 640 are connected to the bus 650 respectively, the memory 620 being used for storing executable program codes; the processor 610 executing a program corresponding to the executable program codes through reading the executable program codes stored in the memory 620, so as to perform the following steps:

detecting whether a display screen of a terminal equipment switches to a screen-on state from a screen-off state when the display screen is in the screen-off state;

displaying at least one information card on the display screen after it is detected that the display screen switches to the screen-on state from the screen-off state, wherein the size of information card is smaller than that of the display screen, the information card includes information to be displayed.

Regarding the specific process of the processor 610 performing the above steps and the steps further performed by the processor 610 through running executable program codes, reference can be made to the related description of the method provided by embodiments of the present application, which will not be repeated here.

Wherein the display screen acts as the input interface and the output interface when the display screen of the terminal equipment is a touch screen; and the display screen acts as the output interface with a keyboard and/or a mouse as the input interface when the display screen of the terminal equipment is not a touch screen.

There exists a variety of forms for a terminal device, which comprise but do not be limited to:

(1) mobile communication equipment: this kind of equipment is characterized in ability of mobile communication and mainly aims to provide voice and data communication. This kind of terminal comprises: smart phones (for example, iPhone), multimedia phones, functional phones and low end phones and the like.

(2) ultra-mobile personal computer equipment: this kind of equipment belongs to the category of personal computer, which has the function of computing and possessing and generally possesses mobile networking property. This kind of terminal comprises: PDA, MID and UMPC equipment and the like, for example iPad.

(3) portable entertainment equipment: this kind of equipment can display and play multimedia content. This kind of equipment comprises: audio and video players (for example, iPods), handheld game consoles, e-books readers, intelligent toys and portable vehicle navigation equipment.

(4) other electronic devices with data exchange function.

As shown above, in the embodiments of the present application, at least one information card is displayed on a display screen after it is detected that the display screen switches to a screen-on state from a screen-off state. The switch of the display screen to the screen-on state from the screen-off state indicates that a user may be in a spare state. In this case, target information potentially desired by the user is displayed in form of an information card, such that the user can browse the target information with spare time, thus increasing usage of the spare time of users.

Embodiments of the present application further provides an application program for performing the method for displaying information when being executed. The method comprises:

detecting whether a display screen of a terminal equipment switches to a screen-on state from a screen-off state when the display screen is in the screen-off state;

displaying at least one information card on the display screen after it is detected that the display screen switches to the screen-on state from the screen-off state, wherein the size of information card is smaller than that of the display screen, the information card includes information to be displayed.

By applying the embodiments shown by the present application disclose a method, at least one information card is displayed on a display screen after it is detected that the display screen switches to a screen-on state from a screen-off state. The switch of the display screen to the screen-on state from the screen-off state indicates that a user may be in a spare state. In this case, target information potentially desired by the user is displayed in form of an information card, such that the user can browse the target information with spare time, thus increasing usage of the spare time of users.

Embodiments of the present application further provides a storage medium for storing application programs, the application programs being used for performing the method for displaying information when being executed, which method comprises:

detecting whether a display screen of a terminal equipment switches to a screen-on state from a screen-off state when the display screen is in the screen-off state;

displaying at least one information card on the display screen after it is detected that the display screen switches to the screen-on state from the screen-off state, wherein the size of information card is smaller than that of the display screen, the information card includes information to be displayed.

By applying the embodiments shown by the present application disclose a method, at least one information card is displayed on a display screen after it is detected that the display screen switches to a screen-on state from a screen-off state. The switch of the display screen to the screen-on state from the screen-off state indicates that a user may be in a spare state. In this case, target information potentially desired by the user is displayed in form of an information card, such that the user can browse the target information with spare time, thus increasing usage of the spare time of users.

The embodiments of a device and terminal equipment are described in a concise manner since they are essentially similar to the embodiments of a method, and the related parts could refer to the parts of the description of embodiments of a method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

All embodiments in the description are described in a correlated manner, and identical or similar parts in various embodiments can be referred to one another, the description for each embodiment all focuses on the differences with other embodiments. Especially, the embodiments of a device are described in a concise manner and reference can be made to the description of the embodiments of a method for its related contents since the embodiments of the device are substantially similar to those of the method.

Those ordinary skilled in the art can understand that all or parts of the steps in the above method embodiments can be accomplished through programs instructing related hardware. The programs can be stored in a computer-readable storage medium, such as ROM/RAM, magnetic disc, optical disk and the like.

The embodiments described above are just preferable embodiments of the present application, and not indented to limit the protection scope of the present application. Any modifications, alternatives, improvements or the like within the spirit and principle of the present application shall fall into the protection scope of the present application.

The invention claimed is:

1. A method for displaying information, wherein the method comprises the steps of:
   detecting whether a display screen of a terminal equipment switches to a screen-on state from a screen-off state when the display screen is in the screen-off state and in a lock-screen state;
   determining whether the display screen has been maintained in the screen-on state for a preset screen-on period;
   displaying at least one information card on the display screen after it is detected that the display screen switches to the screen-on state from the screen-off state and it is determined the display screen has been maintained in the screen-on state for a preset screen-on period, wherein the size of information card is smaller than that of the display screen, one information card containing one piece of information;
   receiving a switching instruction generated according to a predefined rule, and displaying at least one new information card on the display screen to replace the at least one information card;
   the predefined rule being that the information card has been already displayed for a preset duration;
   the method further comprises:
   receiving a first interaction instruction for the information card and performing an operation corresponding to the first interaction instruction;
   wherein the first interaction instruction is a layout adjusting instruction, the step of performing an operation corresponding to the first interaction instruction, comprising:
   obtaining at least two summary cards to be displayed, wherein the content of each summary card is determined according to information obtained from a program of the terminal equipment and each summary card displaying all or part of the information contained in a corresponding information card, the at least two summary cards comprising a summary card of the information card currently being displayed, wherein the at least two summary cards are displayed in at least one column or at least one row as a summary card queue arranged in a non-overlapping manner, wherein each column or row of summary cards corresponds one category of information; and
   replacing the information card currently being displayed with the at least two summary cards,
   wherein, after receiving the layout adjusting instruction, the size of the information card currently being displayed is reduced gradually and finally the information card currently being displayed becomes the summary card to which it corresponds, while other summary cards gradually enter the display screen, and finally the summary card of the information card currently being displayed is displayed along with other summary cards, and
   wherein the information card currently being displayed is displayed in a horizontal arrangement and gradually becomes a summary card, and then becomes a vertically arranged summary card in an overlapping manner.

2. The method of claim 1, wherein the step of receiving a switching instruction generated according to a predefined rule and displaying at least one new information card on the display screen to replace the at least one information card comprises:
   moving the at least one new information card into the display screen from left to right when the at least one information card is moved rightwards out of the display screen, if the switching instruction is to slide rightwards;
   moving the at least one new information card into the display screen from right to left when the at least one information card is moved leftwards out of the display screen, if the switching instruction is to slide leftwards.

3. The method of claim 1, wherein the method further comprises obtaining information to be displayed, which comprises one of the following:
   obtaining the information to be displayed from a local system of the terminal equipment; and
   obtaining the information to be displayed from network side.

4. The method of claim 1, wherein the method further comprises:
   displaying prompt information in a preset position on the display screen, the prompt information being used for prompting the presence of other information cards.

5. The method of claim 4, wherein the step of displaying prompt information in a preset position on the display screen comprises:
   displaying a prompt card on a left boundary and/or a right boundary of the display screen, wherein the size of the prompt card is set according to the remaining size of the display screen, the remaining size being the size obtained by subtracting the size of the information card from the size of the display screen.

6. The method of claim 1, wherein the step of displaying at least one information card on the display screen of the terminal equipment comprises:
   displaying the information card on the display screen in a manner in which at least one information card is arranged horizontally.

7. The method of claim 1, wherein the step of performing an operation corresponding to the first interaction instruction comprising one of the following:

moving the information card upwards or downwards out of the display screen when the first interaction instruction is an instruction of moving out a card;

flipping over the information card and displaying related information of the information to be displayed, which is contained in the information card, on the back of the information card when the first interaction instruction is an instruction of flipping over a card;

adjusting the size of information card on the display screen when the first interaction instruction is an instruction of adjusting card size;

adjusting the number of the information cards displayed on the display screen when the first interaction instruction is an instruction of adjusting the number of cards;

adjusting the display state of information in the information card when the first interaction instruction is an instruction of adjusting information state; and displaying information related to the information card in a new window of the display screen when the first interaction instruction is an instruction of displaying related information.

8. The method of claim 7, wherein when the information card comprises a multimedia resource display area and a text area, the step of flipping over the information card to display related information of the information to be displayed, which is contained in the information card, on the back of the information card comprises:

flipping over the text area of the information card to the back of the information card and displaying related text information of the text information of the text area on the back of the information card.

9. The method of claim 7, wherein the method further comprises:

receiving a second interaction instruction, which is an instruction for a new window of the display screen;

displaying information corresponding to the second interaction instruction.

10. A non-transitory storage medium, wherein the storage medium is used for storing an application program, which are used to perform the method for displaying information of claim 1 when being executed.

11. A terminal equipment, wherein the terminal equipment comprises: a processor, a memory, communication interfaces, input/output interfaces and a bus, wherein the processor, the memory, the communication interfaces and the input/output interfaces are connected to the bus respectively, the memory being used for storing executable program codes; the processor executing a program corresponding to the executable program codes through reading the executable program codes stored in the memory, so as to perform a method for displaying information, which method comprising steps of:

detecting whether a display screen of a terminal equipment switches to a screen-on state from a screen-off state when the display screen is in the screen-off state and in a lock-screen state;

determining whether the display screen has been maintained in the screen-on state for a preset screen-on period;

displaying at least one information card on the display screen after it is detected that the display screen switches to the screen-on state from the screen-off state and it is determined the display screen has been maintained in the screen-on state for a preset screen-on period, wherein the size of information card is smaller than that of the display screen, one information card containing one piece of information;

receiving a switching instruction generated according to a predefined rule, and displaying at least one new information card on the display screen to replace the at least one information card;

the predefined rule being that the information card has been already displayed for a preset duration;

the method for displaying information further comprises:

receiving a first interaction instruction for the information card and performing an operation corresponding to the first interaction instruction;

wherein the first interaction instruction is a layout adjusting instruction, the step of performing an operation corresponding to the first interaction instruction, comprising:

obtaining at least two summary cards to be displayed, wherein the content of each summary card is determined according to information obtained from a program of the terminal equipment and each summary card displaying all or part of the information contained in a corresponding information card, the at least two summary cards comprising a summary card of the information card currently being displayed, wherein the at least two summary cards are displayed in at least one column or at least one row as a summary card queue arranged in a non-overlapping manner, wherein each column or row of summary cards corresponds one category of information; and replacing the information card currently being displayed with the at least two summary cards, wherein, after receiving the layout adjusting instruction, the size of the information card currently being displayed is reduced gradually and finally the information card currently being displayed becomes the summary card to which it corresponds, while other summary cards gradually enter the display screen, and finally the summary card of the information card currently being displayed is displayed along with other summary cards, and wherein the information card currently being displayed is displayed in a horizontal arrangement and gradually becomes a summary card, and then becomes a vertically arranged summary card in an overlapping manner.

12. The terminal equipment of claim 11, wherein the step of receiving a switching instruction generated according to a predefined rule and displaying at least one new information card on the display screen to replace the at least one information card comprises:

moving the at least one new information card into the display screen from left to right when the at least one information card is moved rightwards out of the display screen, if the switching instruction is to slide rightwards;

moving the at least one new information card into the display screen from right to left when the at least one information card is moved leftwards out of the display screen, if the switching instruction is to slide leftwards.

13. The terminal equipment of claim 11, wherein the method for displaying information further comprises obtaining information to be displayed, which comprises one of the following:

obtaining the information to be displayed from a local system of the terminal equipment; and obtaining the information to be displayed from network side.

14. The terminal equipment of claim 11, wherein the method for displaying information further comprises:

displaying prompt information in a preset position on the display screen, the prompt information being used for prompting the presence of other information cards.

15. The terminal equipment of claim 14, wherein the step of displaying prompt information in a preset position on the display screen comprises:
    displaying a prompt card on a left boundary and/or a right boundary of the display screen, wherein the size of the prompt card is set according to the remaining size of the display screen, the remaining size being the size obtained by subtracting the size of the information card from the size of the display screen.

16. The terminal equipment of claim 11, wherein the step of displaying at least one information card on the display screen of the terminal equipment comprises:
    displaying the information card on the display screen in a manner in which at least one information card is arranged horizontally.

17. The terminal equipment of claim 11, wherein the step of performing an operation corresponding to the first interaction instruction comprising one of the following:
    moving the information card upwards or downwards out of the display screen when the first interaction instruction is an instruction of moving out a card;
    flipping over the information card and displaying related information of the information to be displayed, which is contained in the information card, on the back of the information card when the first interaction instruction is an instruction of flipping over a card;
    adjusting the size of information card on the display screen when the first interaction instruction is an instruction of adjusting card size;
    adjusting the number of the information cards displayed on the display screen when the first interaction instruction is an instruction of adjusting the number of cards:
    adjusting the display state of information in the information card when the first interaction instruction is an instruction of adjusting information state; and
    displaying information related to the information card in a new window of the display screen when the first interaction instruction is an instruction of displaying related information.

18. The terminal equipment of claim 17, wherein the method for displaying information further comprises:
    receiving a second interaction instruction, which is an instruction for a new window of the display screen;
    displaying information corresponding to the second interaction instruction.

* * * * *